United States Patent [19]

Evans et al.

[11] 4,321,469
[45] Mar. 23, 1982

[54] NUCLEONIC GAUGE FOR DETERMINING LUBRICANT LEVEL IN A JOINT AND METHOD

[75] Inventors: William P. Evans, Peoria; Jan C. Kline, Brimfield, both of Ill.

[73] Assignee: Caterpillar Tractor Co., Peoria, Ill.

[21] Appl. No.: 140,501

[22] Filed: Dec. 17, 1979

[51] Int. Cl.³ .................. G01N 23/00; G01F 23/00
[52] U.S. Cl. ............................ 250/358 R; 250/357
[58] Field of Search .......... 250/303, 308, 357, 358 R, 250/428, 432 R

[56] References Cited

U.S. PATENT DOCUMENTS

| | | |
|---|---|---|
| 2,748,290 | 5/1956 | Reichertz . |
| 2,843,755 | 7/1958 | Staker et al. . |
| 2,978,581 | 4/1961 | Wehrli ................................ 250/357 |
| 2,984,352 | 5/1961 | Gilman . |
| 3,007,048 | 10/1961 | Knapp et al. ...................... 250/357 |
| 3,185,843 | 5/1965 | Hansen ............................... 250/308 |
| 3,818,232 | 6/1974 | Kirkpatrick ....................... 250/357 |
| 3,944,830 | 3/1976 | Dissing .......................... 250/358 R |

Primary Examiner—Alfred E. Smith
Assistant Examiner—Janice A. Howell
Attorney, Agent, or Firm—Charles E. Lanchantin, Jr.

[57] ABSTRACT

A nucleonic gauge (10) is disclosed for effectively assessing the amount of lubricating fluid in a hinge joint (12) having an elongate reservoir (23) without disassembly of the joint. The gauge includes a disc-type radiation source (54) at one end of the joint for emitting radiation cooperatively with respect to the lubricant reservoir and providing a substantially collimated beam pattern (60), and a detector element (64) in the path of the pattern at the other end of the joint for measuring the radiation activity.

15 Claims, 1 Drawing Figure

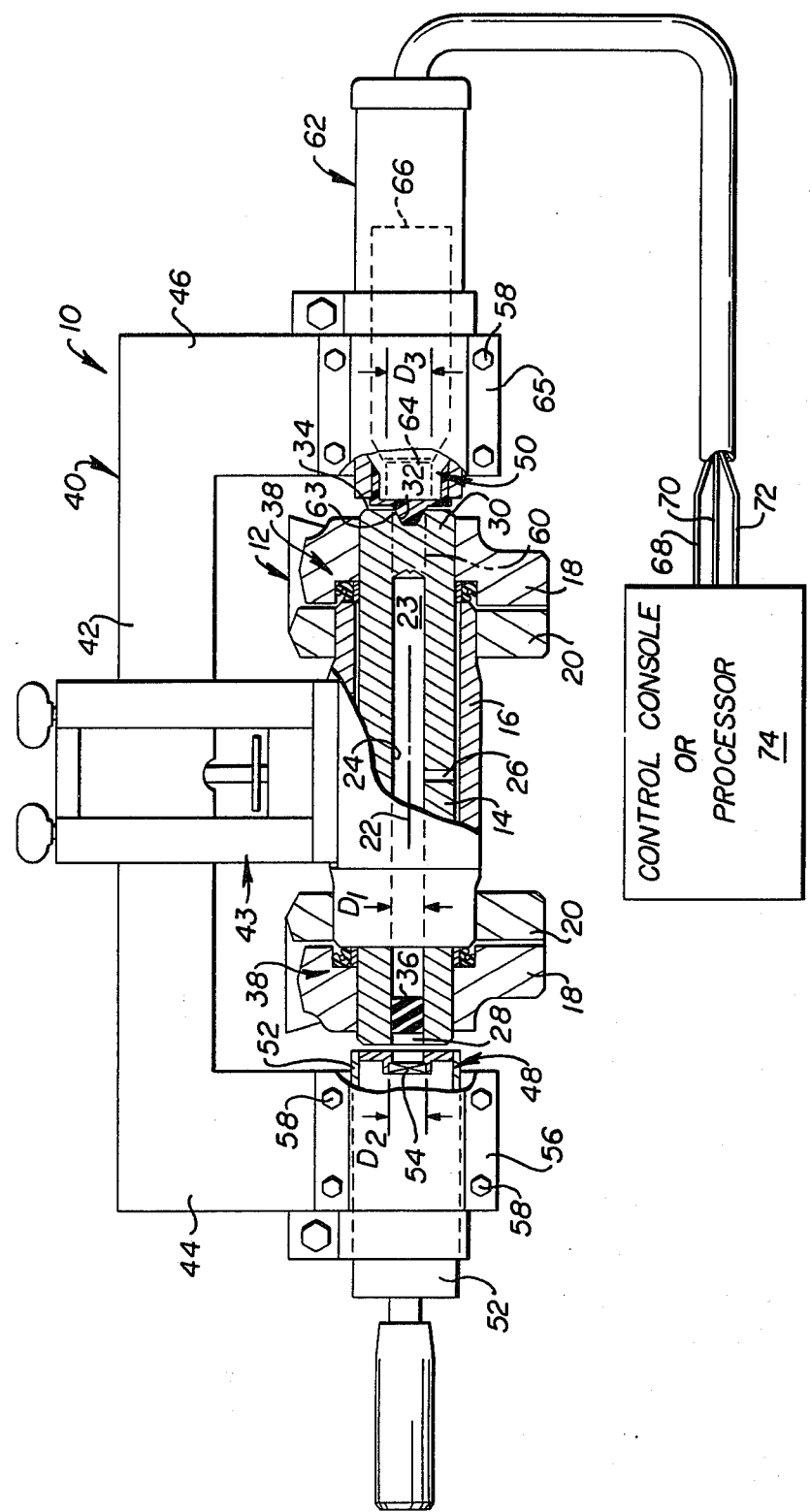

NUCLEONIC GAUGE FOR DETERMINING LUBRICANT LEVEL IN A JOINT AND METHOD

DESCRIPTION

1. Technical Field

The present invention relates to a radiation gauge for passing radiation through an assembled hinge joint and quantitatively assessing the amount of lubricating fluid therein.

2. Background Art

A large number of radiation measurement devices are known for measuring fill level in cans or containers, density of fluid passing through a pipe, hollow article wall thicknesses, and so forth. These devices include a radiation source which projects penetrating rays to a cooperating detector through the article to be measured. The big advantage is that the hollow articles don't have to be opened or disassembled for the necessary readings to be obtained.

For example, U.S. Pat. No. 3,007,048 to R. A. Knapp, et al on Oct. 31, 1961 discloses a system for measuring the fluid level in one or more upright cans by passing radiation generally transversely across the top of the can toward one or more detectors. U.S. Pat. No. 2,613,326 to G. Herzog on Oct. 7, 1952 teaches passing radiation across a tube to determine the proportions of two substances passing therethrough. U.S. Pat. No. 2,843,755 to W. P. Staker, et al on July 15, 1958 shows a gauge having a U-shaped carrier for holding the radiation source and the detector on the opposite sides of a hollow housing for determining whether lubricant is in it. U.S. Pat. No. 2,984,352 to S. Gilman on May 16, 1961 utilizes a nucleonic gauge device for determining cigarette density.

Although the aforementioned radiation devices or nucleonic gauges have been known for some time, there has heretofor not been an effective and nondestructive way of quantitatively determining the amount of oil fill of an assembled pivot joint such as the joint for an endless track chain for a crawler tractor or the like without partial disassembly of each joint. Such joints are initially filled automatically by an assembly line apparatus with a metered amount of oil. A rubber stopper is then inserted in the opening leading to an elongate oil hole reservoir for containment of the oil in the joint. Cycle time with the assembly line apparatus is 6–10 seconds per joint. One problem is that there is a need for quickly checking whether such joints have been properly filled before assembly on the vehicle. Another problem is that after the track chains have experienced severe wear and usage on the vehicle in the field there has not been a convenient way of determining whether any joint has lost an undesirable amount of lubricant due to a seal failure, for example. Conventional methods require the joints to be at least partially opened in order to provide access to the reservoir to determine the fluid-level therein, and this results in a waste of energy and time and can allow dirt or other foreign material to get into the joint.

Thus, what is desired is to provide a nucleonic gauge that will so match the construction of an assembled joint having an elongate lubricant reservoir that reliable and accurate quantitative readings of oil fill levels can be consistently obtained, and to develop a convenient, easily alignable, and effective method of using the gauge in the factory or in the field without disassembly of the joint.

DISCLOSURE OF INVENTION

In accordance with one aspect of the present invention a nucleonic gauge is provided for determining the amount of lubricant in an assembled joint having an axis and an elongate lubricant reservoir disposed on the axis. Advantageously, the nucleonic gauge includes a radiation source for emitting penetrating radiation at one end of the joint, cooperating with the lubricant reservoir, and providing a collimated beam pattern at the other end of the joint, and a detector device located in the path of the collimated beam pattern for measuring the transmitted radiation level and relating same to the amount of lubricant in the joint with quick and reliable accuracy.

In another aspect of the invention a method of determining lubricant level in an assembled joint having an elongate lubricant reservoir on the axis thereof includes: arranging the axis of the joint in a horizontal plane; passing penetrating radiation from a source at one end of the joint and alignably with the reservoir to provide a substantially collimated beam pattern at the other end of the joint; and measuring the amount of radiation at a detector located at the other end of the joint in the path of the collimated beam pattern.

BRIEF DESCRIPTION OF THE DRAWINGS

The sole FIGURE is a diagrammatic elevational view of an assembled hinge joint, a nucleonic gauge, and associated electrical control showing one embodiment of the present invention with portions broken open and shown in section to better illustrate details of the construction thereof.

BEST MODE FOR CARRYING OUT THE INVENTION

Referring to the drawing, a nucleonic gauge 10 is illustrated in generally end-to-end embracing relationship to an assembled endless track chain hinge joint 12 such as can be used on a crawler tractor. The hinge joint is defined by a generally cylindrical pin 14, a tubular bushing 16 pivotally mounted on the pin, and first and second pairs of track links 18,20 connected respectively to the pin and bushing at the opposite ends thereof. The pin has an axis 22 and an elongate cylindrical lubricant reservoir 23 defined primarily by a cylindrical bore 24 having a preselected diameter $D_1$, as shown in the drawing. Moreover, one or more transverse passages 26 are defined in the pin for communicating fluid from the reservoir radially outwardly to the region between the pin and bushing. The lubricant reservoir extends through the pin concentrically along the axis from an open end or cylindrical opening 28 to a closed end 30, and a conical centering recess 32 is formed symmetrically in an end face 34 of the closed end. An elastomeric or plastic stopper or plug 36 is disposed in the cylindrical opening 28 and a pair of annular seal assemblies identified generally by the reference numeral 38 are located between the first pair of links 18 and the opposite ends of the bushing 16 to contain lubricant within the joint.

Referring now to the nucleonic gauge 10, the embodiment thereof illustrated is noted to be of the portable type for conveniently checking lubricant levels of the joints 12 out in the field. It basically includes a U-shaped carrier member or yoke 40 having a bight portion 42, an adjustable Vee block 43 on the bight portion, and first and second legs 44,46 for releasably carrying radiation means 48 and detector means 50 respectively. In general, the radiation means 48 emits penetrating radiation at the left end of the joint when viewing the drawing, and the detector means 50 responds to the radiation activity or attenuated intensity at the right end to establish a signal corresponding to the lubricant level within the joint.

The radiation means 48 includes a cylindrical holder assembly 52 for supporting a preselected radiation source 54 in proper cooperating relationship to the open end 28 of the pin 14, and more particularly to the elongate lubricant reservoir 23. The holder assembly is releasably connected to the first leg 44 of the carrier member 40 by a split clamp device 56 having a plurality of threaded fasteners 58.

More particularly, radiation source 54 preferably includes a gamma emitting radioisotope selected from the group consisting of cesium 137, chromium 51, cobalt 60 and tin 113. We prefer utilizing a "soft" source or a gamma ray emitting source of low photon energy for greatest sensitivity to the oil. However, we also recognize that americium 241 has several advantages as a radiation source. Cesium 137 has the advantage of long life and ease of measurement and is preferred; the former substantially eliminates having to change the source because of decay. Although not shown in the drawing, we have used a radiation source of a metallic hydroxide collected as a precipitate on a filter paper disc and held in a brass planchet closed with lucite. We have determined that a planar, cylindrical radiation disc oriented substantially normal to the axis 22 is particularly effective and that the diameter of the disc, identified as $D_2$ in the drawing, should preferably be at least as large or moderately greater than the diameter $D_1$ of the reservoir 23. As an alternate to the aforementioned radioactive filter paper disc, we also contemplate use of a relatively flat cylindrical vial of the same diameter $D_2$ containing a chloride solution of the aforementioned radioactive elements. As still another alternate homogeneous disc, we contemplate use of the aforementioned radioisotopes electroplated as a thin metallic deposit on the surface of a small cylindrical metallic disc. With such construction and juxtaposed position relative to the open end 28 of the pin 14 the homogeneous disc-type radiation source 54 advantageously causes a collimated beam pattern 60 whose radiant energy is positively directed toward the detector means 50 along the length of the lubricant reservoir 23.

The detector means 50 also includes a cylindrical holder assembly 62 having a truncated conical nose portion or machine center 63 for supporting a preselected scintillating detector element 64 in proper cooperating relationship to the closed end 30 of the pin 14. The holder assembly 62 is releasably connected to the second leg 46 of the carrier member 40 by a split clamp device 65 comparable to the opposite split clamp device 56. Preferably, the detector element 64 is a cylindrical sodium iodide crystal having a diameter $D_3$ at least as large or moderately greater than either of the diameters $D_1$ or $D_2$ of the reservoir 23 and the radiation source 54 respectively. Such crystal detector element fluoresces as a function of the level of radiation received from the collimated beam pattern 60. The detector means 50 also includes a photomultiplier tube and a preamplifier identified in the drawing collectively by the reference numeral 66, and which elements are disposed within the holder assembly in juxtaposed relation to the detector for converting the detector light emissions to the desired useful electrical output signals via a data output signal lead 68. Alternate detector means which are contemplated can include end window Geiger tubes which do not require photo multipliers and preamplifiers.

A pair of power leads 70,72 provide power respectively to the photomultiplier and preamplifier (or Geiger tube) from a control console or processor 74, and the output signal lead 68 directs the data readings to the processor. In the processor the data readings are further amplified, discrimated, and counted in a conventional manner to provide the desired measure of the radiation activity per unit of time.

INDUSTRIAL APPLICABILITY

In operation, the spacing between radiation means 48 and detector means 50 can be easily adjusted for different track sizes to accommodate different lengths of pins 14 in the hinge joints 12. This can be accomplished by partial release of the split clamps 56 and 65 upon screwthreaded loosening of the fasteners 58, by manual movement of the cylindrical holder assemblies 52 and 62 toward or away from one another, and by retightening of the split clamps upon screwthreaded tightening of the fasteners.

Adjustment of the Vee block 43 toward and away from the bight portion 42 of the carrier member 40 will allow accommodation of the gauge 10 to different diameters of the bushings 16 in order to assure alignment of the axis of radiation disc 54 and detector element 64 with the axis 22 of the hinge joint 12. In this regard, it can be appreciated that the conical nose portion 63 of the holder assembly 62 can be inserted in the recess 32 in the closed end of the pin 16 as an aid in quickly coaxially aligning the joint and gauge.

Initially, the nucleonic gauge 10 can be aligned with a "standard" reference joint 12 that does not have any lubricant in it, and a reading taken at the processor 74 after the emitted radiation from the radiation disc 54 has travelled through the plug 36, the empty reservoir 23, and the closed end 30 of the pin 14. For greater accuracy, the nucleonic gauge can be subsequently aligned with another "standard" reference joint that is completely filled with lubricant and another reading taken at the processor. With one or both of these readings taken, the processor readings can be calibrated to coincide with any decay of the energy level of the radiation source 54 or to compensate for instrumentation variations.

Tests have indicated that the transmitted data signal in the output signal lead 68 from the nucleonic gauge 10 is substantially a straight line fuction of the quantitative amount of lubricating fluid or oil in the joint 12, with a full joint being attenuated the most. It was found that a point source of radiation that is representative of prior art, as opposed to the preferred cylindrical disc 54 that we propose, did not provide a straight line relationship because the beam pattern was conical. Such typical conical patterns result in reading errors of the lubricating fluid level at the detector and are deemed to be unsatisfactory. Tests have further indicated that radiation measurements normal or transverse to the axis 22 of the joint have been unsatisfactory because of a substantial drop in the sensitivity of the readings and a marked decrease in the accuracy thereof. We feel that the use of the aforementioned preferred gamma emitting radioisotopes contributes to a significant degree to the sensitivity and the reliability of the measurements.

Thus, the nucleonic gauge 10 has been found to be reliable and accurate in non-destructive quantitative fluid level readings of a hinge joint having an elongate lubricant reservoir 23. This is due to a substantial degree in the relationship of the diameters $D_1$, $D_2$ and $D_3$ illustrated in the drawing. A bore diameter $D_1$ about 17.5 mm (0.688″), a disc source diameter $D_2$ of about 17.8 mm (0.70″) and a detector diameter of $D_3$ of about 25.4 mm (1.00″) was found to be very effective. Accordingly, we have concluded that the disc source diameter $D_2$ should be at least as great as the elongate bore diameter $D_1$ and preferably moderately greater, e.g. about 1 to about 5% greater, to allow a preselected minimal degree of misalignment between the gauge and the joint at the first end. Similarly, we have exposed photographic means, not shown, to the substantially collimated beam pattern 60 by placing photographic film normal to the axis 22 adjacent the closed end 30 of the pin 16, and have observed a circular exposure to the radiation corresponding to the diameter of the elongate bore 24 and the diameter of the radiation disc 54. The conclusion was therefor reached that the detector source diameter $D_3$ should be at least as great as the diameters $D_1$ and $D_2$ and preferably moderately greater, e.g. preferably about 20 to about 50% greater, to again allow a preselected degree of misalignment between the gauge and the joint at the second end.

The nucleonic gauge 10 and its associated processor 74 can also be used to determine whether the hinge joint 12 has been satisfactorily manufactured. For example, should a broken drill bit be in the bore 24 or should the bore not be precisely manufactured to the proper axial length then the readings would deviate from the desired range at the processor and appropriate action could be taken. Moreover, the amount of radioisotope used in the radiation source can be varied from a first level for achieving a reliable radiation count in 6–10 seconds to a lower level for also achieving a reliable radiation count in about a period of 1 minute; the former or first energy level is useful in an automatic assembly line arrangement wherein timing must be compatible with cycle time on the assembly line and yet proper shielding is easily effected, whereas the latter or lower energy level is useful in a more portable version of the nucleonic gauge to present minimal radiation control problems out in the field.

In view of the foregoing, it is apparent that the nucleonic gauge 10 is particularly effective in quantitatively determining the fluid level within an unopened joint 12 having an elongate reservoir 23, such as the joint of an endless track chain as hereinbefore described. However, it is clearly extremely valuable for obtaining comparable data on other joints as well; for example, the pivotal hinge joints of loader linkage, the hinge joints of earthmoving implements attached to vehicles, etc.

Other aspects, objects and advantages of this invention can be obtained from a study of the drawings, the disclosure and the appended claims.

We claim:

1. A nucleonic gauge (10) for quantitatively determining the amount of lubricant in an assembled joint (12) having an axis (22) and an elongate lubricant reservoir (23) on the axis (22), the gauge (10) comprising:
   radiation means (48) for homogeneously emitting penetrating gamma radiation at one end of the joint (12), cooperating with the lubricant reservoir (23), and providing a collimated beam pattern (60) at the other end of the joint (12), the radiation means (48) including a cylindrical radiation disc (54);
   detector means (50) for reacting to the radiation in relation to the amount of lubricating fluid in the joint (12), the detector means (50) including a detector element (64) located at the other end of the joint (12) in the path of the collimated beam pattern (60); and
   supporting means (40,43) for serially aligning the radiation means (48), the joint (12) and lubricant reservoir (23), and the detector means (50) substantially on the axis (22).

2. The nucleonic gauge (10) of claim 1 wherein said cylindrical radiation disc (54) is planar and oriented normal to the axis (22).

3. The nucleonic gauge (10) of claim 2 wherein said elongate lubricant reservoir (23) includes a cylindrical bore (24) of preselected diameter $D_1$ and said cylindrical radiation disc (54) has a diameter $D_2$ at least as large as the size of the preselected diameter $D_1$.

4. The nucleonic gauge (10) of claim 1 wherein the radiation disc (54) includes a metallic hydroxide collected as a precipitate on a filter paper disc.

5. The nucleonic gauge (10) of claim 1 wherein said radiation disc (54) includes a gamma emitting rardioisotope selected from the group consisting of cesium 137, chromium 51, cobalt 60 and tin 113.

6. The nucleonic gauge (10) of claim 5 wherein the radiation disc (54) includes a cylindrical vial (54) containing a chloride solution of said gamma emitting radioisotope.

7. The nucleonic gauge (10) of claim 5 wherein the radiation disc (54) has a surface layer of said gamma emitting radioisotope deposited thereon.

8. The nucleonic gauge (10) of claim 1 wherein the assembled joint (12) is a joint of an endless track chain.

9. The nucleonic gauge (10) of claim 1 wherein the supporting means (40,43) includes a U-shaped carrier member (40) having first and second legs (44,46), the radiation means (48) being releasably connected to the first leg (44), the detector means (50) being releasably connected to the second leg (46).

10. The nucleonic gauge (10) of claim 9 wherein the supporting means (40,43) includes a Vee block connected to the carrier member (40).

11. The nucleonic gauge (10) of claim 1 wherein the supporting means (40,43) includes a Vee block (43) and wherein the assembled joint (12) includes an elongate pin (14) and a surrounding bushing (16), the Vee block (43) being of a construction sufficient for engaging the bushing (16) and aligning the gauge (10) with the joint (12).

12. A method of quantitatively determining the amount of lubricant in an assembled joint (12) having an axis (22) and an elongate lubricant reservoir (23) on the axis (22) comprising:
   arranging the axis (22) of the joint (12) substantially in a horizontal plane;
   homogeneously emitting penetrating gamma radiation from a cylindrical radiation disc (54) at one end of the joint (12) cooperatively and alignably with the reservoir (23) and providing a substantially collimated beam pattern (60) at the other end of the joint (12); and
   measuring the transmitted radiation in a preselected period of time received at a detector element (64)

located at the other end of the joint (12) in the path of the collimated beam pattern (60).

13. The method of claim 12 including the step of comparing the measured level of radiation with a predetermined range of readings corresponding to different known levels of lubricant in the joint (12).

14. The method of claim 13 including calibrating the source (54) and the detector element (64) by measuring the amount of radiation traversing a standard reference joint (12) having a known lubricant level.

15. The method of claim 13 including indicating whether the measured level of radiation is outside of a preselected range whose limits correspond to a preselected deep lubricant reservoir (23) and a preselected shallow lubricant reservoir (23) as taken along the axis (22) of a standard reference joint (12).

* * * * *